US005206481A

United States Patent [19]

Rossner et al.

[11] Patent Number: 5,206,481

[45] Date of Patent: Apr. 27, 1993

[54] PLASMA BURNER FOR TRANSFERRED ELECTRIC ARC

[75] Inventors: Heinrich O. Rossner; Ulrich Scheffler; Gebhard Tomalla, all of Essen; Herbert Klein, Kiel, all of Fed. Rep. of Germany

[73] Assignee: Fried. Krupp Gesellschaft Mit Beschrankter Haftung, Essen, Fed. Rep. of Germany

[21] Appl. No.: 725,628

[22] Filed: Jul. 2, 1991

[30] Foreign Application Priority Data

Jul. 11, 1990 [DE] Fed. Rep. of Germany ....... 4022111

[51] Int. Cl.[5] .............................................. B23K 9/00

[52] U.S. Cl. .......................... 219/121.48; 219/121.49

[58] Field of Search ...................... 219/121.48, 121.49, 219/121.5

[56] References Cited

U.S. PATENT DOCUMENTS

| | | | |
|---|---|---|---|
| 3,147,329 | 9/1964 | Gage | 373/22 |
| 3,463,957 | 8/1969 | Fuksiewicz | 219/75 |
| 4,082,914 | 4/1978 | Bertnichuk et al. | 373/22 |
| 4,125,754 | 11/1978 | Wasserman et al. | 219/121.5 |
| 4,466,824 | 8/1984 | Gauvin et al. | 373/22 |
| 4,564,740 | 1/1986 | Paton et al. | 219/121.48 |
| 4,628,177 | 12/1986 | Dempsey et al. | 219/121.48 |
| 4,645,899 | 2/1987 | Bebber et al. | 219/121.48 |
| 4,958,057 | 9/1990 | Shiraishi et al. | 219/121.5 |
| 5,124,525 | 6/1992 | Severance, Jr. et al. | 219/121.5 |
| 5,132,512 | 7/1992 | Sanders et al. | 219/121.5 |

FOREIGN PATENT DOCUMENTS

| | | | |
|---|---|---|---|
| 0339563 | 1/1986 | European Pat. Off. . | |
| 0168810 | 11/1989 | European Pat. Off. . | |
| 3426410 | 1/1986 | Fed. Rep. of Germany . | |
| 3328777 | 1/1990 | Fed. Rep. of Germany . | |
| 3435680 | 2/1990 | Fed. Rep. of Germany . | |
| 2-20667 | 1/1990 | Japan | 219/121.49 |
| 2-37977 | 2/1990 | Japan | 219/121.49 |
| 766088 | 6/1982 | U.S.S.R. | 219/121.48 |

*Primary Examiner*—Bruce A. Reynolds
*Assistant Examiner*—John A. Jeffery
*Attorney, Agent, or Firm*—Herbert Dubno

[57] ABSTRACT

A plasma burner has an annular passage extending along an insulated tube defining the outer wall of the electrode lance and located between the electrode lance and the multi wall burner shell to deliver the auxiliary gas outwardly of the plasma gas. The nozzle forming end of the electrode lance has a coolant circulation as has the burner shell and the annular passage extends substantially to the coolant inlets and outlets of the burner. The construction avoids the formation of parasitic arcs.

19 Claims, 4 Drawing Sheets

PLASMA BURNER FOR TRANSFERRED ELECTRIC ARC

FIELD OF THE INVENTION

Our present invention relates to a plasma burner of the transferred electric arc type which can have a central electrode, a nozzle end piece concentric or coaxial therewith, an annular gap between the electrode and the nozzle end piece from which the plasma forming gas emerges and, coaxial therewith, a burner shell with outer, middle and inner walls such that between the nozzle end piece and the burner shell an annular passage is provided whose inner wall is at least partly formed by an electrically insulating tube separating the two parts.

BACKGROUND OF THE INVENTION

A significant problem in the operation of plasma burners with alternating current and three phase electric current is the development of parasitic electric arcs which burn in parallel to the main electric arc. These parasitic electric arcs are predominantly concentrated at the lower edge of the nozzle or burner shell and the outer regions of the nozzle endpiece and the end face of the burner. Parasitic electric arcs are not only detrimental to the stability of the arc column and hence the formation and stability of the plasma, but also affect the efficiency and economy of the plasma burner and any apparatus in which the plasma burner is parallel to a significant degree because of the excess utilization of energy. Parasitic arcs can also give rise to complete destruction of the plasma burner In German Patent Document DE-PS 33 28 777, a system for reducing parasitic arcs is described whereby the annular passage between the electrode and the nozzle along the inner surface of the nozzle is provided with an electrically insulating coating In practice this has been found to provide only partial protection since parasitic arcs can find current flow paths externally of the insulating coating.

Another approach to the elimination of parasitic arcs is described in German Patent Document DE-PS 34 35 680. In this system, on the inner wall of a water cooled nozzle, an insulating part is provided to subdivide it into two separate wall portions. This insulating part extends over the entire cross section and electrically insulates the separated parts from one another.

The drawback of this system is that it is difficult to find a fully satisfactory insulating material which can tolerate the extremely high temperatures of the furnace atmosphere in the apparatus in which the plasma burner is used.

Other attempts have been made to eliminate plasma arcs by providing a groove in an end face of the nozzle and accommodating in this groove an insulating ring. The groove can be formed by the outer wall of a nozzle stub or end piece and can have a burner shell such that the burner shell at its end has a flange turned toward the axis of the burner forming a heat shield for the insulating member which is set back from it.

When a burner of this type is used in an atmosphere containing electrically conductive particles, for example metal particles or molten plant or foundry dust, the electrically conductive dust can collect on the cooled insulating member and form an electrically conductive bridge shortcircuiting between the nozzle stub and the burner shell and sustaining parasitic arcs at least along the outer edge of the end face of the burner shell.

In general, therefore, it can be said that prior techniques attempting to eliminate parasitic arcs from plasma burners have not been fully satisfactory.

OBJECTS OF THE INVENTION

It is, therefore, the principal object of the present invention to provide an improved plasma burner for a transferred-arc plasma generator which will obviate the drawbacks of earlier plasma burners, especially with respect to the formation of parasitic arcs.

Still another object of the invention is to provide a plasma burner which can be operated more economically with greater main arc and plasma stability and with reduced wear by comparison with earlier plasma burners.

Still another object of the invention is to provide a plasma burner in which the danger of the formation of parasitic arcs, especially when the system is operated in an alternating current mode, is greatly reduced or eliminated.

SUMMARY OF THE INVENTION

These objects and others which will become apparent hereinafter are attained, in accordance with the invention, in a burner as initially described herein, wherein the annular passage between the nozzle end piece and the burner shell extends at least rearwardly from the plasma forming front end of the burner to the level of the coolant inlet and outlet of the burner shell and at its rearward end is connected with a source of a gaseous medium under pressure by a pipe connection.

More specifically, a transferred arc plasma burner according to the invention can comprise:

a central electrode;

a nozzle end piece concentric with an end of the central electrode at a front of the burner and spaced from the central electrode by an annular gap for discharging a plasma gas from the burner;

a burner shell surrounding the nozzle end piece at an end of the burner shell and extending axially from the end of the burner shell along the electrode, the burner shell being formed with a coolant inlet and a coolant outlet at a location axially spaced from and distal to the end of the burner shell, the burner shell defining an annular passage with the nozzle end piece communicating with a mouth spacedly surrounding the annular gap, the annular passage extending axially from the nozzle end piece distally at least to the location, an inner wall of the annular passage being formed by an electrically insulating tube separating the burner shell from the nozzle end piece; and means at a rear end of the annular passage remote from the nozzle end piece forming a pipe connection communicating with a source of a gaseous medium under pressure.

The coaxial annular passage, by virtue of its significant length alone, provides a significant improvement in the operational reliability and life of the plasma burner and, by eliminating mechanical connections and surfaces on which electrically conductive vapors can condense or dust can deposit, reduces the tendency for conductive bridging between the nozzle stub and the burner shell.

The pipe connection with a source of a gaseous medium under pressure permits the gaseous medium to flush through the annular passage and the flushing flow of gas through the annular passage provides a further step toward operational reliability and improved operating life of the plasma.

For example, the mouth or outlet regions of the annular passage are additionally cooled by this gas.

Any electrically conductive vapor, which might prove to be a problem on condensation, or dust which might collect, are effectively prevented from penetrating into or accumulating in the annular passage.

Backfiring plasma arcs are precluded by the flushing flow and molten metal slag spatterings which might otherwise penetrate into the annular passage, are deflected away and cooled by this flow of gas.

Furthermore, this gas flow through the annular passage forms a shielding gas envelope around the plasma arc and prevents oxidizing gas, for example, atmospheric air, which might be sucked into the plasma arc from the ambient atmosphere, from being drawn into the arc. Such oxidizing gases tend to erode high melting point metals and to be detrimental to those portions of the burner which are susceptible to oxidation even outside the plasma gas region and hence the gas flow can protect the burner. When the use of an oxidizing gas in the annular passage is not a problem, i.e. when the plasma needed not be shielded from the oxidizing atmosphere, the gas may be an oxidizing gas and is then effective to oxidize metal vapors which might be generated in the region of the annular passage to metal oxides of low metal conductivity and thereby provide additional assurance against conducted bridging and the formation of parasitic arcs.

Because of the cooling effect of the gas traversing the annular passage, the coatings or materials used at the mouth of the annular passage can have increased useful life by comparison with earlier plasma burner systems. Furthermore, the gas enveloped formed by the shielding gas can reduce radiant energy loss from the plasma arc and thereby reduce detrimental effects on any containment.

Because the annular passage extends substantially to the level of the coolant inlet and outlet of the burner shell, there is a sufficient length of the annular passage to insure a highly uniform distribution of the gas flow in this passage and hence a uniform discharge of the gas at the mouth of this passage.

Since this additional gas is supplied independently of the feed of the main plasma gas, the plasma burner can be utilized in a highly advantageous way for the transport or entrainment of solid materials in pulverulent or granular form via the additional gas. By contrast to systems in which there is a local feed of solid materials by separate lances provided in addition to the plasma burner, the plasma burner can utilize the entire plasma circumference and a substantial part of the length of the plasma arc along its axis for the melting and evaporation of solid materials.

According to a feature of the invention, the distribution of the additional or auxiliary gas flow in the annular passage is further improved by providing the pipe connection at the rear end of the annular passage so that it imparts a tangential flow component to the auxiliary gas which is there introduced.

Instead of the single pipe fitting, of course, the pipe connection can include a plurality of pipe fittings connected to the source of auxiliary gas, angularly equispaced around the rear end of the annular passage and each opening tangentially into the annular passage to impart the tangential flow component to the gas. The at least partly tangential influx of the gas into the channel and the resulting uniform distribution of the auxiliary gas has been found to be especially effective when solids are to be entrained in the auxiliary gas for displacement thereby.

Since the electrode and nozzle end piece require only a reduced coolant flow by comparison with earlier systems and based upon the cooling effect provided by the auxiliary gas, it has been found to be advantageous to provide the burner shell with its own coolant circulation so that the coolant throughput can be varied to suit the degree of thermal stress to which the burner shell may be subject.

For securing the burner shell it has been found to be advantageous to provide the burner shell, according to the invention, with an outer wall, a middle wall and an inner wall axial with one another and forming a coolant circulation path communicating with the coolant inlet and the coolant outlet extending between the inner wall and the middle wall and between the middle wall and the outer wall. The outer wall can be connected to a housing part and preferably the middle wall and inner wall are connected to the outer wall with spacing from the coolant inlet and outlet, e.g. via the housing part. It has been found to be advantageous, therefore, to fix only the outer wall while the inner and middle walls can be permitted to slide relative to the housing part and sealingly engage the latter. This sliding action makes it possible for the parts of the burner shell to undergo thermal expansion and contraction without stressing the shell.

Advantageously, the middle wall is connected with the outer wall by a connecting part formed with passages for the coolant and the connecting part has a front end carrying a nozzle-forming shell portion of the burner shell. The nozzle-forming shell portion can be connected to the connecting part by a simple screwthread connection. The term "simple screwthread" is used here to indicate that one part is simply threaded onto or into the other so that they can be separated by an unscrewing action of the two parts the nozzle-forming portion thus can be readily removed from the outer wall of the burner shell by simply unscrewing it. This enables ready replacement of the nozzle portion and also facilitates rapid replacement of the electrode, the nozzle end piece and any related elements, all of which may be mounted or dismounted by unscrewing. Of course, that means that the parts are assembled by screwthreads.

It has been found to be advantageous, especially when the annular passage between the nozzle and burner shell is to be used to convey pulverulent or granular solids by the pressurized auxiliary gas to the electric arc, to form the annular passage in the region of its mouth so that it converges conically in the direction of the arc. This is advantageously achieved by forming the mouth between inner and outer conical surfaces.

For stable construction of the burner and to avoid the formation of deposits, the electrically insulating tube which separates the nozzle end piece from the burner shell can lie along the outer surface of the nozzle end piece and can additionally lie along the conical inner surface of the annular passage in the region of the mouth.

The surfaces forming the conical mouth region of the annular passage can be formed with coatings of an electrically insulating material, for example, a ceramic, which is refractory in nature so that it is possible, utilizing these surfaces, to feed even electrically conductive solids through the annular passage to the arc.

In this case the insulating tube which surrounds the electrode lance extends to or includes the connecting piece of the feeder line of the rearward end of the annular passage.

To impart to the insulating tube surrounding the electrode lance an additional heat protection, the lumen or clear diameter of the outer edge of the annular passage at its mouth is preferably smaller than the outer diameter of the inner wall of the annular passage upstream of the conical convergence.

The nozzle end piece is advantageously mechanically connected via a ring-shaped body of electrically insulating material with the electrode and can form a unit therewith. This ring-shaped body is provided with passages parallel to the principal axis of the plasma burner and through which the main plasma gas passes to the annular gap between the electrode and the nozzle end shape. Additionally, for integration of the nozzle end piece with the electrode or the electrode lance, a common coolant circulation is provided for them.

To influence the gas flow, a displacement body can be disposed in the annular passage to form a constriction.

When the plasma burner has an extremely long shank and sharply inclined installation positions, the annular passage advantageously has spacer or supporting bodies included therein. These supporting bodies can have a streamlined shape, can be offset from one another and can be advantageously mounted on the insulating tube with which the electrode lance included nozzle end piece is surrounded. The support bodies can be formed as hollow or solid structures, can extend parallel to the axis or in a helical pattern and can effect the displacement and flow direction of additives through the annular passage. Hollow bodies extending parallel to the axis can be formed preferably as nozzle-shaped ceramic tubes which can be extended beyond the end face of the nozzle end shape so that powder can be locally and directionally fed to the plasma arc.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
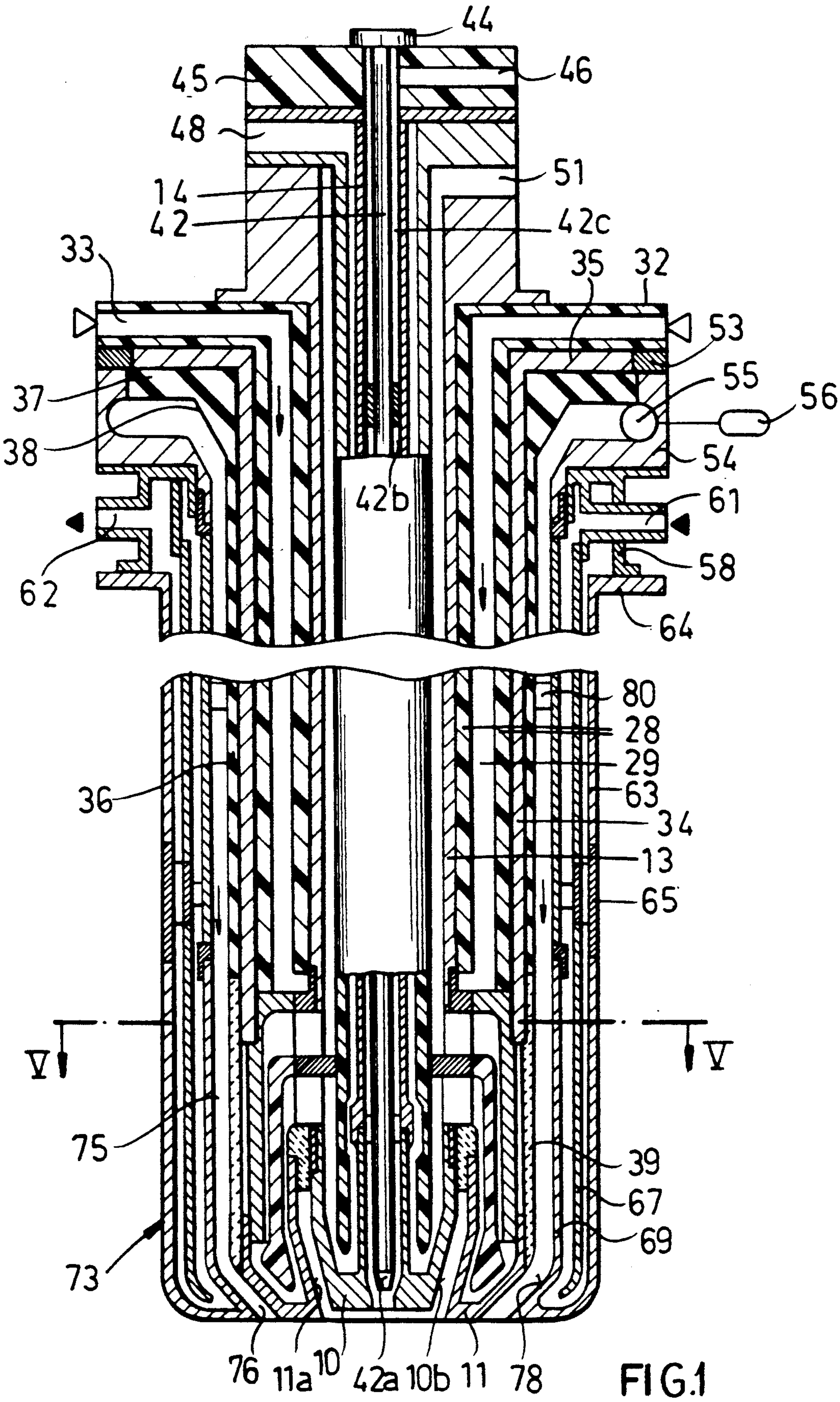
FIG. 1 is a diagrammatically longitudinal section of a plasma burner according to the invention, details of which are illustrated in subsequent figures and which has been drawn to a scale which does not permit all of the nuances of the other figures to be visible.

The plasma burner of the invention shown in the drawing comprises an electrode lance and a burner shell.

The electrode lance, in turn, basically is made up of an electrode 10, a nozzle stub or end piece 11 and the parts for holding these elements.

The electrode 10 has a weakly conical end **10*b* at its front end and the nozzle end piece has a correspondingly conical surface 11*a*** but a more steeply conical surface forming the inner surface of a mouth for the auxiliary gas as will be discussed in greater detail below.

Figure 2:
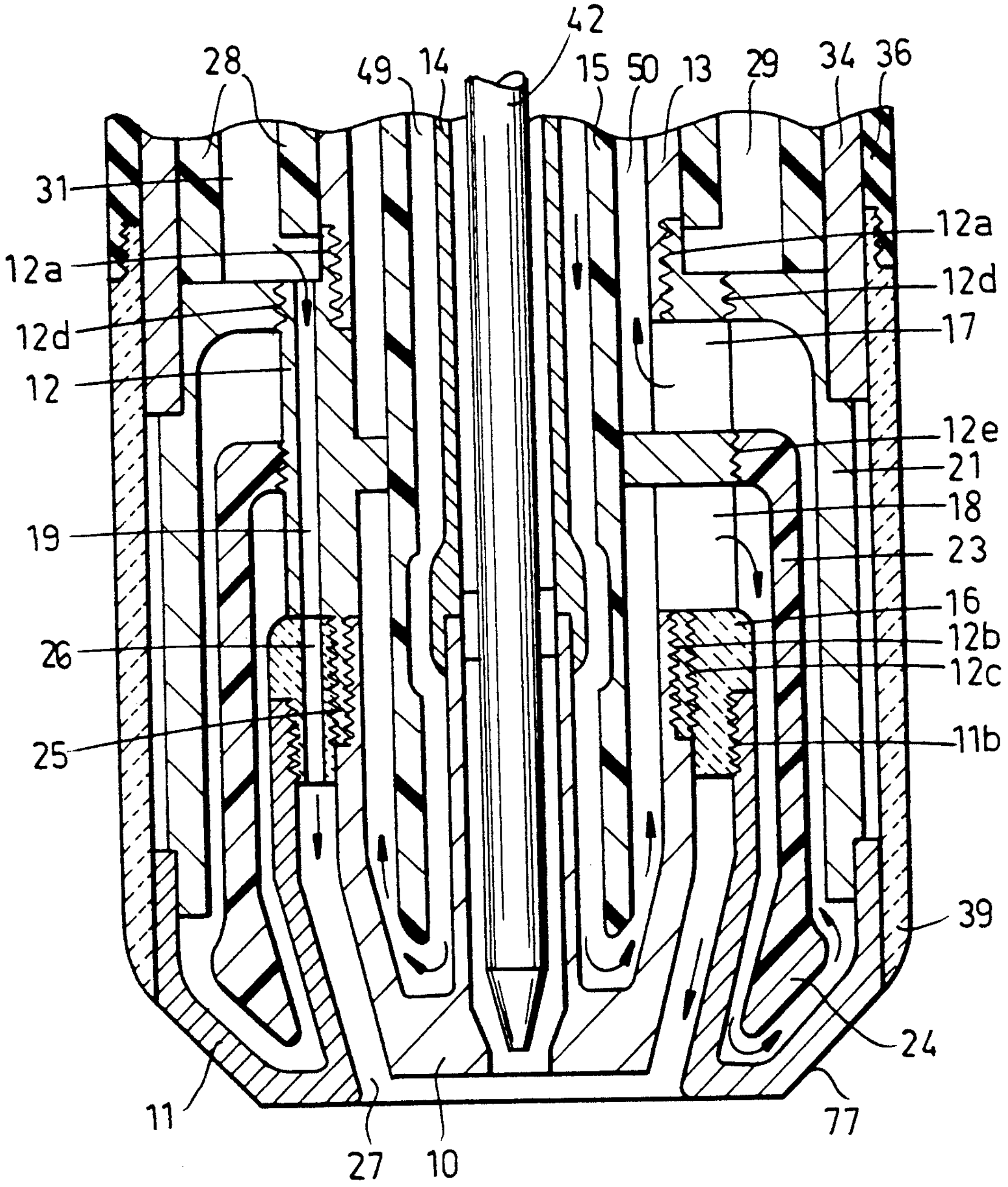
FIG. 2 is a detailed view of the lower portion or front of the plasma burner of the invention without the burner shell, i.e. showing only the electrode lance portion of the burner to a larger scale than in FIG. 1.

The electrode 10 has an outer wall connected via a subsequently sleeve-shaped connecting piece 12 with the current delivery tube 13 connected to the main voltage source. Between the electrode 10 and the connecting piece 12 and between the connecting piece 12 and the current delivery tube 13, respective screwthreads **12*a* and 12*b* are provided The inner wall of the electrode is slidable on an inner tube 14 fixed at the rear of the plasma burner. Between the current supply tube 13 and the inner tube 14, an intermediate tube 15 of a plastic material is provided for separating the various partial circulations of the coolant traversing the electrode. At its lower region or toward the front of the burner, the central tube 15 also serves to deflect the coolant flow as represented by the arrows in FIG. 2**.

The inner wall of the nozzle end piece 11 is connected by a screwthread **11*b* with a ring-shaped body 16 of an electrically and thermally insulating material, for example, a ceramic and this body 16 is connected by a screwthread 12*c* with the connecting piece 12**.

Figure 4:
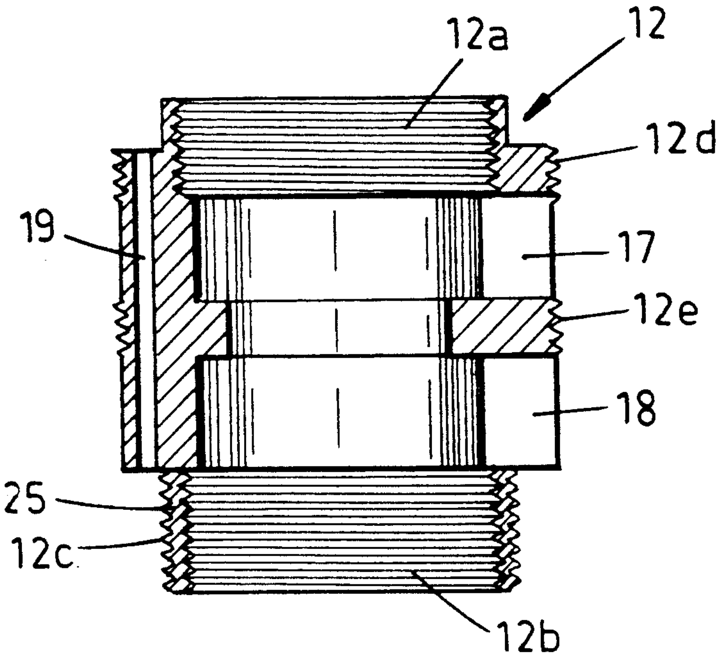
FIG. 4 is a detailed cross section of part of a connecting piece between a tube connected to the voltage source and the electrode, as seen in an axial section.
Figure 5:
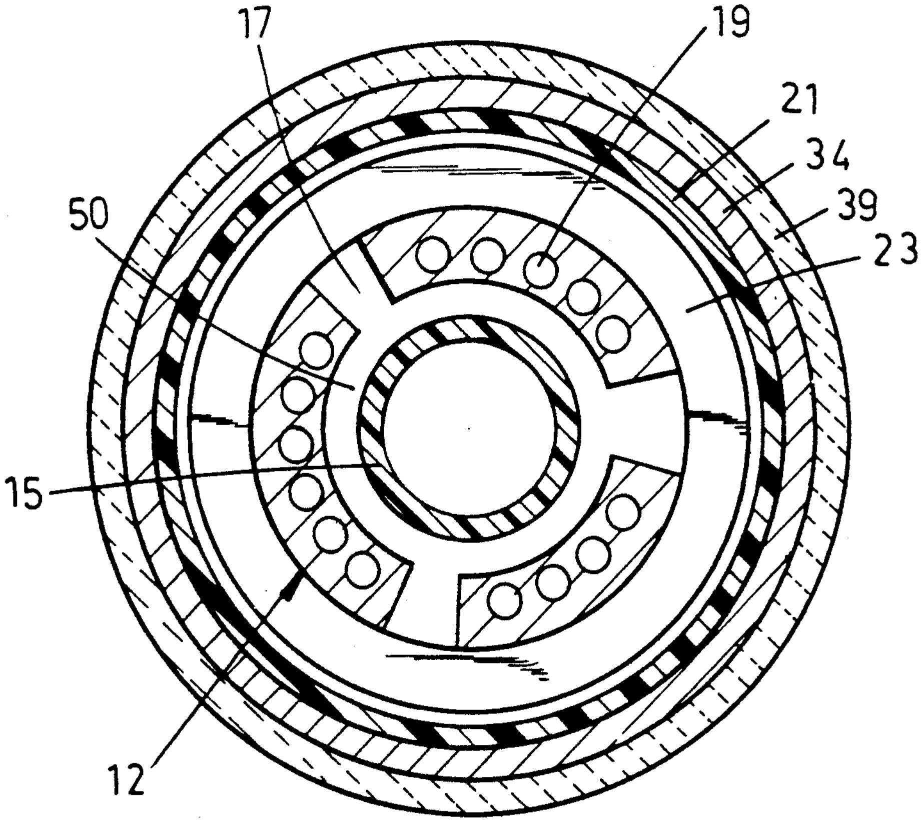
FIG. 5 is a cross sectional view through the electrode lance taken along the line V—V of FIG. 1

The connecting piece 12 (see FIGS. 4 and 5) is provided along its periphery in angularly equispaced relationship with upper and lower radial passages 17, 18 and, parallel to the burner axis, with axially extending passages 19.

Above the upper radial passages 17, the inner flange of a sleeve 21 of plastic material is connected by a screwthread **12*d* to the connecting piece 12 while an inner flange of a central pipe 23 is connected by a further screwthread pairing 12*e*** with this connecting body.

On the lower sleeve-like projection, the connecting piece 16 is screwed and is threadedly engaged by the nozzle end piece 11. The ring-shaped body 16 has passages 26 parallel to the axis of the burner and communicating with the corresponding passages 19 in the connecting piece 12 at their lower ends, the passages 26 open into an annular gap 27 between the electrode 10 and the nozzle end piece 11.

A plastic electrically insulating tube 28 surrounds the current-flow tube and has passages 29 parallel to the axis of the burner and opening at lower regions of the tube 28 into an annular compartment 31. The hollow compartment 31 communicates with the passages 19 of the connecting piece 16.

At its upper end, the pipe 28 is formed with a flange 32 which has radial passages 33 formed therein communicating with the axial passages 29. To increase the stability of the plastic pipe 28, the latter is surrounded by a steel tube 34 with a flange 35. The outer diameter of the steel tube 34 corresponds to the outer diameter of the nozzle end piece.

On the outer surface of the steel tube 34, an insulating tube 36 is provided and has, at its upper end, a flange 37. Between the cylindrical outer surface of the insulating tube 36 and the underside of the flange 37, a transition surface 38 is provided. A further, lower ceramic tube 39 has its inner surface abutting the outer surface of the steel tube 34.

The ceramic tube 39 is connected releasably by a screwthread connection 39*a* with the upper insulating tube 36 at its lower end, the lower ceramic tube 39 merges steplessly with the conical outer surface of the nozzle endpiece 11, i.e. is flush therewith.

Extending through the inner tube 14 of the electrode lance is an auxiliary electrode 42 which can be centered by spacers 42*b* in the tube 14 and can have a generally conical lower end 42*a*. At its upper end, the auxiliary electrode 42 is connected with a terminal 44 for the ignition current.

The auxiliary electrode 42 at its upper end is separated by a plastic disc 45 from the inner tube 14 and the remaining parts of the electrode lance. The plastic disc 45 has a radial inlet 46 through which an ignition gas is fed to an annular passage 42*c* between the auxiliary electrode 42 and the inner tube 14.

The electrode 10 and the nozzle end piece form a common combined coolant circulation. The coolant flows from the coolant inlet 48 through the annular passage 49 between the inner tube 14 and the middle tube 15, is deflected about the lower end of the middle tube 15 and flows through the radial passages 18 to be deflected at 24 and then passes through the passages 17 and the annular passage 50 between the current supply tube 13 and the middle tube 15 to the coolant outlet 51. All of the aforedescribed parts collectively form the electrode lance.

A housing part 54, electrically insulated by a plastic washer or ring 53, is centered on the outer side of the flange 37 and is mechanically connected rigidly with the flange 32 of the plastic pipe 28. The housing part 54 has a pipe connection for the tangential inlet of a shielding or envelope gas as represented at 55, this pipe connection being connected to the compressed gas source 56.

At its inner side, the housing part 54 is affixed to a so called pipe connector 58 which is formed with a coolant inlet 61 and a coolant outlet 62. On the pipe connector 58, in addition, an outer wall 63 in the form of a tube, is connected by its flange 64.

Figure 3:
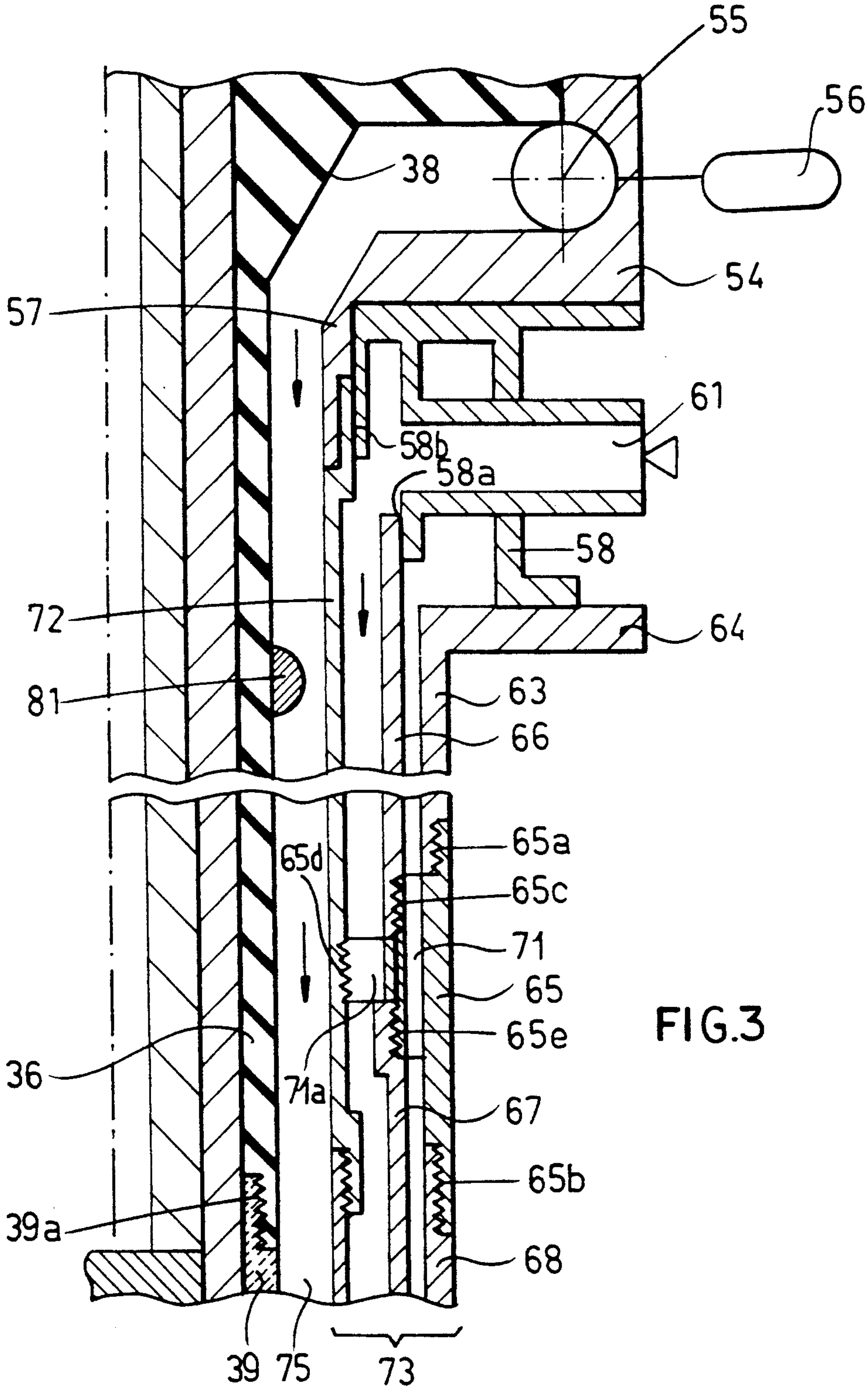
FIG. 3 is a fragmentary detailed view of the upper portion of the burner of FIG. 1, also drawn to a larger scale and illustrating in particular the region of the coolant inlet to the burner shell.

At the lower end of the tube 63 a connecting piece 65 is detachably connected. At an internal screwthread 65*a* of the connecting piece 65 (FIG. 3), the upper tube 63 is connected, while at a lower screwthread 65*b*, the member 68 of the burner shell 73 is detachably connected.

The connecting piece 65 also has an internal screwthread 65*c* at which an upper tube member 66 of the middle wall of the burner shell is attached, while a screwthread 65*d* connects the inner tube or wall to this connector as well. A screwthread 65*e* connects the lower tube member 67 of the middle tube to the connector as well.

The connector 65 is provided with passages 71 and 71*a* through which the coolant can circulate in the axial direction.

The upper central wall 66 has its upper end sealingly engaged with but slidable along an inner surface of the pipe connector 58 at 58*a* while the inner wall 72 is sealingly and slidably engaged with the pipe connector 58 at 58*b* and with a cylindrical flange 57 of the housing 54.

All of the elements from the housing 54 to the shell member 68 collectively form the burner shell 73 and form a unit therewith.

The complete outer surface of the burner shell 73 is free from discontinuities like gaps and steps so that the conditions for effective sealing of the plasma burner in a wall of a vessel are met. The coolant path from the inlet 61 to the outlet 62 between the inner and middle walls and between the middle and outer walls is highly uniform and there are no formations or other structures which will allow parasitic arc to form.

Between the insulating tube 36 which forms the outer wall of the electrode lance, and the burner shell 73, an annular passage 75 is formed which extends over the greater part of its length parallel to the principal axis of the burner and at its region adjacent the front end at the nozzle end piece 11, runs conically at 76. The conical portion 76 of the annular passage 75 forms a mouth which is defined by the outer surface of the nozzle end piece 11 and a conical inner surface of the nozzle wall of member 68. Both conical surfaces can have coatings 77 or 78 of ceramic.

The clear diameter of the member 68 at its end face is less than the outer diameter of the nozzle end piece 11 so that the end face of the cooled member 68 can form a heat shield for the ceramic tube 39 against the heat developed around the plasma burner or arc and the hot atmosphere surrounding the same.

Especially with large plasma burner lengths and/or inclined layers of the structure, the insulating tube 36 can be provided with spacing or support bodies 80 on which the inner tube 72 of the burner shell are braced. In addition, the insulating tube 36 can also have a displacement body 81 (FIG. 3) therein to control the flow through the passage. The spacer 80 can extend the full length of the annular passage if desired and can include measuring devices for measuring the flow of the auxiliary gas.

We claim:

1. A plasma burner for transferred electric arc, comprising:

a central electrode;

a nozzle end piece concentric with an end of said central electrode at a front of the burner and spaced from said central electrode by an annular gap for discharging a plasma gas from said burner;

a burner shell surrounding said nozzle end piece at an end of said burner shell and extending axially from said end of said burner shell along said electrode, said burner shell being formed with a coolant inlet and a coolant outlet at a location axially spaced from and distal to said end of said burner shell, said burner shell defining an annular passage with said nozzle end piece communicating with a mouth spacedly surrounding said annular gap, said annular passage extending axially from said nozzle end piece distally at least to said location, an inner wall of said annular passage being formed by an electrically insulating tube separating said burner shell from said nozzle end piece; and means at a rear end of said annular passage remote from said nozzle end piece forming a pipe connection communicating with a source of a gaseous medium under pressure.

2. The plasma burner defined in claim 1 wherein said means at said rear end of said axial passage includes means for introducing said gaseous medium under pressure into said annular passage with a tangential component of velocity of said gaseous medium.

3. The plasma burner defined in claim 1 wherein said burner shell is formed with an outer wall, a middle wall and an inner wall coaxial with one another and forming a coolant circulation path communicating with said coolant inlet and said coolant outlet and extending between said inner wall and said middle wall and between said middle wall and said outer wall.

4. The plasma burner defined in claim 3 wherein said outer wall is connected to a housing part, said middle wall and said inner wall are connected to said outer wall with spacing from said location, and said middle wall and said inner wall are sealingly slidable on said housing part.

5. The plasma burner defined in claim 4 wherein said middle wall is connected with said outer wall by a connecting part formed with passages for said coolant and said connecting part has a front end carrying a nozzle-forming shell portion of said burner shell.

6. The plasma burner defined in claim 5 wherein said nozzle-forming shell portion is connected to said connecting part by a simple screwthread connection.

7. The plasma burner defined in claim 1 wherein said annular passage between said nozzle end piece and the burner shell has a conical inner surface and a conical outer surface, said conical surfaces both converging in a direction of an arc generated at said central electrode.

8. The plasma burner defined in claim 7 wherein said electrically insulating tube separating said burner shell from said nozzle end piece is applied along an exterior of said nozzle end piece and defines a conical surface of said annular passage in a region forming said mouth of said annular passage.

9. The plasma burner defined in claim 7 wherein both of said conical surfaces are coated with electrically insulating material in a region of said mouth and said electrically insulating tube extends to a rear end thereof in a region of said pipe connection.

10. The plasma burner defined in claim 7 wherein the diameter of the outer edge of the annular passage at said mouth is less than an outer diameter of an inner wall of said annular passage upstream of convergence of said conical surfaces.

11. The plasma burner defined in claim 1 wherein said nozzle end piece is mechanically connected by a ring-shaped body of electrically insulating material with said electrode and forms a unit therewith, said ring-shaped body being formed with passages extending parallel to an axis of the burner from an upstream annular passage for said plasma gas to said gap.

12. The plasma burner defined in claim 11 wherein said electrode and said nozzle end piece are formed with a common coolant circulation.

13. The plasma burner defined in claim 1 wherein said annular passage is formed with flow-cross-section-constricting bodies.

14. The plasma burner defined in claim 13 wherein said flow-cross-section-constricting bodies are displacement bodies.

15. The plasma-burner defined in claim 13 wherein said flow-cross-section-constricting bodies are spacer bodies.

16. The plasma burner defined in claim 15 wherein said spacer bodies are hollow bodies.

17. The plasma burner defined in claim 16 wherein said hollow bodies are provided with flow-measurement means.

18. The plasma burner defined in claim 16 wherein said hollow bodies extend substantially a full length of the annular passage.

19. The plasma burner defined in claim 18 wherein said hollow bodies have an axially extending extension projecting beyond an end face of said nozzle end piece.

* * * * *